March 12, 1935. D. D. PEEBLES 1,993,944
DEFOAMING APPARATUS
Filed Sept. 19, 1933
FIG_1_
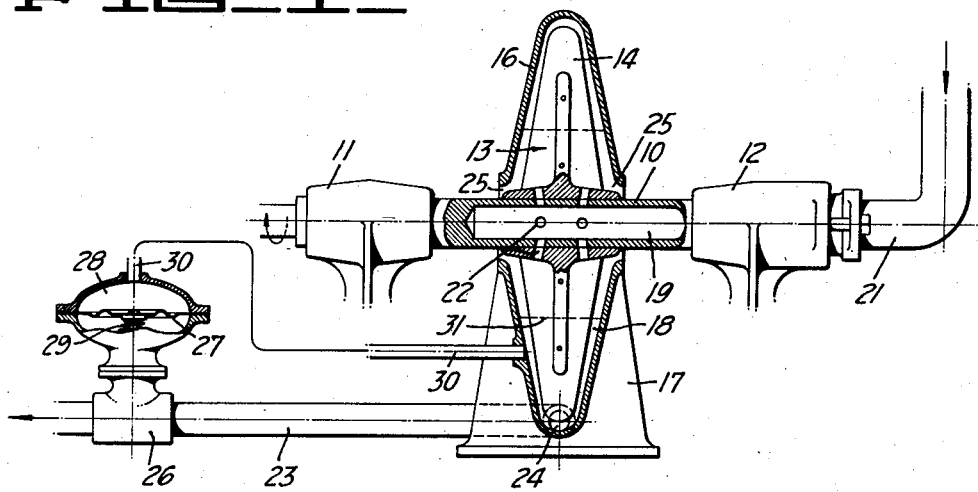
FIG_2_
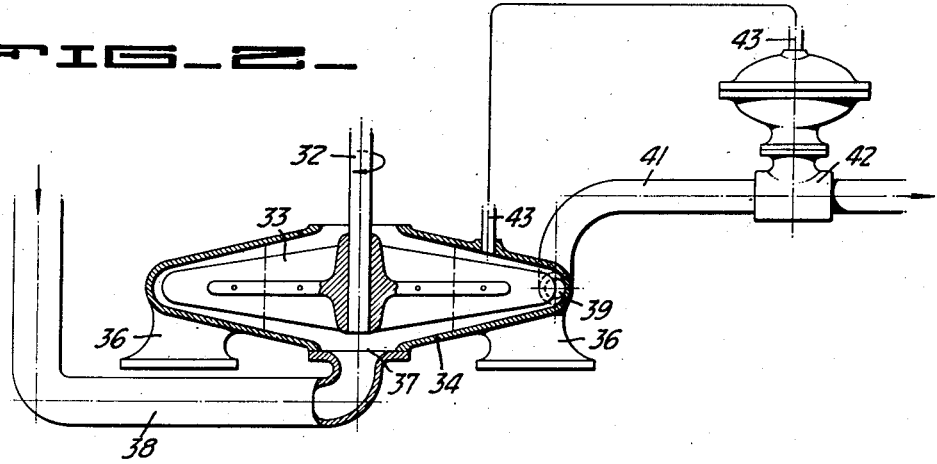
INVENTOR
David D. Peebles
BY
White, Prost, Flehr, Lothrop
ATTORNEYS Patented Mar. 12, 1935

1,993,944

UNITED STATES PATENT OFFICE 1,993,944

DEFOAMING APPARATUS

David D. Peebles, Eureka, Calif.

Application September 19, 1933, Serial No. 690,106

6 Claims. (Cl. 183—2.6)

This invention relates generally to apparatus for the treatment of various liquid materials to deform the same. Such apparatus is useful in many commercial processes and systems where the liquid material being treated or handled tends to foam or froth to a detrimental degree.

It is a general object of the invention to provide an apparatus of the above character which will be highly effective in its action and which will kill foam or froth without chemical treatment or wastage of the foamed component.

A further object of the invention is to provide an apparatus of the above character which will be extremely simple in its construction and operation, and which will require a relatively small amount of power for its operation.

Another object of the invention is to provide a defoaming apparatus which will be largely automatic in its operation, and which can be operated where the flow of material supplied thereto may be variable.

Further objects of the invention will appear from the following description in which the preferred embodiments of the invention have been set forth in detail in conjunction with the accompanying drawing.

Referring to the drawing:

Figure 1 is a side elevational view, in cross-section, illustrating an apparatus incorporating the present invention.

Figure 2 is a side elevational view, partly in cross-section, illustrating a modified form of apparatus.

Referring first to Figure 1, the apparatus illustrated therein consists of a shaft 10 rotatably supported by the journals 11 and 12. Mounted upon the shaft 10 there is an impeller 13, which is provided with a plurality of radially extending paddles or vanes 14. Embracing the impeller 13 there is a casing or housing 16, which can be provided with a suitable base 17 for supporting the same. The interior of this casing forms a treatment chamber 18 within which the material to be defoamed is treated.

With the modification of Figure 1, the material to be defoamed is introduced into the chamber 18 through the rotating shaft 10. Thus, the shaft in this case is formed hollow to provide an inner passage 19 into which liquid material can be introduced by way of pipe 21. Ports 22 are provided to permit flow of the liquid material from passage 19 into the casing chamber 18. The discharge of defoamed liquid material from the casing 16 occurs through a suitable pipe 23. This pipe communicates with the outer portion of chamber 18 through the outlet opening 24, and, as shown in Figure 1, this outlet opening preferably leads off tangentially from the periphery of the casing. In order to permit the escape of air or other gas removed from the material being treated, the casing is shown in communication with the atmosphere through openings 25.

In order to secure proper defoaming action, and in order to automatically prevent the discharge of material which has not been properly defoamed, a flow control valve 26 has been shown inserted in the pipe line 23. This flow control valve is actuated in response to varying fluid pressure, and to this end is shown provided with a flexible diaphragm 27, upon one side of which a closed fluid chamber 28 is formed. Diaphragm 27 is connected to the stem or like movable operating member of the valve 26, and a suitable bias, such as a compression spring 29, is provided so that the valve is normally urged toward closed position. Pressure chamber 28 is shown connected by fluid pipe 30 with the casing 16. The point of communication between the pipe 30 and the casing 16 is located inwardly with respect to the outlet 24, as illustrated in Figure 1, for a reason which will be presently explained.

Operation of the apparatus described above is as follows:

The liquid material which it is desired to defoam is fed by gravity through pipe 21 into the shaft passage 19, from which it flows into the casing 16 through the ports 22. Shaft 10 is rotated at a relatively high rate of speed, so that the liquid material received in the casing chamber 18 is swirled about the interior of the casing with a minimum of slippage with respect to the impeller. Foamed components of the liquid feed, when subjected to the swirling action, are broken down by centrifugal force to release the air or the gaseous components thereof and to agglomerate the bubble films. Since the valve 26 is normally closed, no discharge of defoamed material can occur through pipe 23 until a substantial pressure head has been transmitted through pipe 30 to the chamber 28. Therefore, when a zone of defoamed material has accumulated within the casing 16 to a depth sufficiently far to exert a substantial pressure head upon the pipe 30, as, for example, to a depth indicated by line 31, the valve 26 is automatically opened to permit discharge of the defoamed material. From this arrangement it is evident that a zone of substantial depth of defoamed material will always be maintained within the chamber 18. During a period of operation the inner line of demarcation of this zone cannot extend outwardly beyond the point of communication of the pipe 30 with the chamber 18, because under such conditions substantially no pressure is transmitted through pipe 30, and valve 26 is closed to prevent the discharge of further defoamed material. This provision for the maintenance of a zone of defoamed material of substantial depth likewise causes the apparatus to automatically accommodate itself to variations in the rate of speed, aside from making impossible the discharge of material which has not been properly defoamed.

With respect to the manner in which valve 26 serves to regulate flow through pipe 23, the opening and closing movements of this valve can be relatively abrupt, in response to substantial variations in the depth of the zone of defoamed material in chamber 18, or, if desired, valve 26 may be of such a character as to adjust itself between closed and full open positions, in accordance with the pressure transmitted through pipe 30. The latter mode of operation is desirable under conditions requiring a substantially uninterrupted flow of the defoamed material.

The modification illustrated in Figure 2 operates in substantially the same manner as the modification of Figure 1. However, in this case the drive shaft 32 is shown arranged vertically and, instead of supplying the feed material through the drive shaft, the shaft 32 is solid and has its lower end connected to the impeller 33. The casing 34 is arranged horizontally and is shown supported by a suitable base structure 36. The lower side of the casing 34 is provided with a centrally located inflow opening 37 which is in communication with the feed pipe 38. The outflow opening 39 leads off tangentially from the casing 34 and communicates with the discharge pipe 41. The flow control valve 42 in the discharge conduit 41 likewise has a pressure-operating chamber, as with the modification of Figure 1, which is connected to one side of the casing 34 through a pipe 43.

It is evident that my invention has wide application where foamed components of liquid material are undesirable. For example, I have employed it with good results in the dairy industry for the defoaming of milk, thereby facilitating the handling of this material and the carrying out of special processes for the manufacture of milk products. Since the apparatus serves to discharge the defoamed material under considerable head, its use in many instances will enable elimination of further pumping equipment, to deliver the material to a considerable elevation or to further apparatus under pressure.

I claim:

1. Defoaming apparatus comprising a casing adapted to receive a stream of foamed liquid material, means for causing a body of said material to swirl about within said casing whereby foamed components thereof are defoamed, liquid outlet means communicating with the casing for effecting removal of defoamed liquid from the outer portion of said body under the centrifugal head thereby developed and without refoaming of the same, and means for automatically maintaining a zone of defoamed material within said casing and extending inwardly for a substantial distance from said liquid outlet means.

2. Defoaming apparatus comprising a casing adapted to receive a stream of foamed liquid material, means for causing a body of said material to swirl about within said casing whereby foamed components thereof are defoamed, said casing being provided with an outlet opening and a discharge pipe communicating therewith for effecting removal of defoamed liquid from the outer portion of said body under the centrifugal head thereby developed, and means for automatically maintaining a zone of defoamed liquid material within said casing and extending inwardly for a substantial distance from said outlet opening, said last means including mechanism for regulating the flow rate of material with respect to said casing, said mechanism being responsive to variations in the depth of said zone.

3. Defoaming apparatus comprising an impeller adapted to be rotated, a casing embracing said impeller and adapted to receive a stream of foamed liquid material, whereby a body of said material is caused to rotate with the impeller and about the interior of the casing, said casing being provided with an outlet opening and a discharge pipe communicating therewith for effecting removal of defoamed liquid from the outer portion of said body under the centrifugal head thereby developed, and means for automatically maintaining a zone of defoamed liquid material within said casing and extending inwardly for a substantial distance from said outlet opening.

4. Defoaming apparatus comprising an impeller adapted to be rotated, a casing embracing said impeller and adapted to receive a stream of foamed liquid material, whereby a body of said material is caused to rotate with the impeller and about the interior of the casing, said casing being provided with an outlet opening and a discharge pipe communicating therewith for effecting removal of defoamed liquid from the outer portion of said body under the centrifugal head thereby developed, and means for automatically maintaining a zone of defoamed liquid material within said casing and extending inwardly for a substantial distance from said outlet opening, said last means including mechanism for regulating the flow rate with respect to said casing, said mechanism being responsive to variations in the depth of said zone.

5. Defoaming apparatus comprising an impeller adapted to be rotated, a casing embracing said impeller and adapted to receive a stream of foamed liquid material, whereby a body of said material is caused to rotate with the impeller and about the interior of the casing, said casing being provided with an outlet opening and a discharge pipe communicating therewith for effecting removal of defoamed liquid from the outer portion of said body under the centrifugal head thereby developed, and means for automatically maintaining a zone of defoamed liquid within said casing and extending inwardly for a substantial distance from said outlet opening, said last means including a flow regulator for varying the rate of flow of liquid material through said opening, and means responsive to the pressure head developed at a point inwardly of said opening, within said casing, for actuating said regulator.

6. Defoaming apparatus comprising an impeller adapted to be rotated, a casing embracing said impeller adapted to receive a stream of foamed liquid material, whereby a body of said material is caused to rotate with the impeller and about the interior of the casing, said casing being provided with an outlet opening and a discharge pipe communicating therewith for effecting removal of defoamed liquid from the outer portion of said body under the centrifugal head thereby developed, and means for automatically maintaining a zone of defoamed liquid material within said casing and extending inwardly for a substantial distance from said outlet opening, said last means including a pressure-operated regulator for controlling the rate of flow of liquid through said outlet opening, and a fluid pressure connection between said regulator and said casing, the point of communication of said connection with said casing being inwardly a substantial distance from said outlet opening.

DAVID D. PEEBLES.